United States Patent [19]
Kos

[11] Patent Number: 5,959,853
[45] Date of Patent: Sep. 28, 1999

[54] CLOSED-LOOP SWITCHED CAPACITOR NETWORK POWER SUPPLY

[76] Inventor: Marek John Kos, 9957 Darrow Park Dr. Apt. 214B, Twinsburg, Ohio 44087

[21] Appl. No.: 09/138,856

[22] Filed: Aug. 24, 1998

[51] Int. Cl.$^6$ ........................................ H02M 3/18
[52] U.S. Cl. ................................................. 363/59
[58] Field of Search .................................. 363/59, 60, 62, 363/74, 78; 323/282, 285; 327/337, 554

[56] References Cited

U.S. PATENT DOCUMENTS

| | | | |
|---|---|---|---|
| 4,398,099 | 8/1983 | Benoit-Gonin et al. | 307/246 |
| 4,679,131 | 7/1987 | Filliman | 363/21 |
| 4,710,724 | 12/1987 | Connell et al. | 330/9 |
| 5,021,749 | 6/1991 | Kasai et al. | 331/17 |
| 5,414,614 | 5/1995 | Fette et al. | 363/59 |
| 5,541,531 | 7/1996 | Kultgen | 326/62 |
| 5,745,002 | 4/1998 | Bachirotto et al. | 327/554 |

*Primary Examiner*—Matthew Nguyen
*Attorney, Agent, or Firm*—Merchant & Gould P.C.

[57] ABSTRACT

A closed-loop switched capacitor power supply converts a supply voltage into an output voltage that rapidly approaches a set-point voltage by using a variable frequency source, a switched capacitor network and a feedback control circuit. The variable frequency source provides the switched capacitor network with a control voltage having a control frequency that affects the impedance of the switched capacitor network. The switched capacitor network comprises one or more network sections, each one having a grounded capacitor with the other terminal coupled to a supply voltage through a first switch and coupled to the load through a second switch. The first and second switches work in a complementary manner, such that when the first switch is closed the capacitor is charged by the supply voltage, and when the second switch is closed the capacitor discharges into the output of the switched capacitor network. The feedback control circuit is coupled to the output of the switched capacitor network and uses a proportional integral/derivative compensator to regulate the control frequency of the variable frequency source in accordance with the difference between the output voltage and the set-point value. In this way, the output voltage of the power supply can be controlled by varying the frequency of the control voltage of the variable frequency source. Embodiments with additional capacitor networks are advantageous as output ripple is reduced and the overall energy efficiency of the circuit is increased. The power supply is also capable of measuring the power consumption of the load with high accuracy.

17 Claims, 8 Drawing Sheets

CLOSED-LOOP SWITCHED CAPACITOR NETWORK POWER SUPPLY

FIELD OF THE INVENTION

This invention relates to power supplies, and more particularly to closed-loop switched capacitor network power supplies.

BACKGROUND OF THE INVENTION

The steady growth in the use of popular consumer and industrial electronic devices, such as laptop computers, cellular phones, portable compact disc players, and desktop printers, is increasing industry demand for low ripple, power efficient, and high speed switching voltage regulators and power supplies. These types of products require power supplies which are inexpensive, light weight, and small.

Most currently available power supplies and voltage regulators use inductive or resistive components to regulate voltage output. Resistive components are inefficient, because they directly use energy as a means of providing a load with a specific voltage. Inductors store energy within a magnetic field, but are bulky, expensive, and suffer from winding resistance losses, eddy current losses, and hysteresis losses. Further, the use of inductors is not conducive to the manufacture of a power supply using modern lithographic methods.

Some power supplies use capacitors for the generation of DC voltage for low power applications, such as that disclosed in U.S. Pat. No. 5,414,614 to Fette et al., where banks of switched capacitors are used to step-up or step-down power. A digital controller is used to turn switches located within the capacitor network on and off in order to add in or exclude capacitors from the active network. However, since this power supply uses a highly complex array of capacitors and two closed loop controls, the response time to changes in power output ratio is suboptimal. Further, since the digital control disclosed in U.S. Pat. No. 5,414,614 uses a look-up table to configure the switched capacitor network, significant processing time is required to vary the voltage. These system limitations prevent the power supply from reacting effectively to an alternating or variable set-point for the generation of AC power. Finally, this power supply produces a certain amount of voltage ripple due to the particular configuration of the switched capacitors.

Accordingly, there is a need for a switched capacitor power supply which efficiently delivers a desired level of voltage, minimizes output voltage ripple, is constructed out of relatively few components for added reliability, provides energy efficiently with a minimum of energy loss in the form of joule heating, can react quickly to sudden load changes without inductive lag or voltage spikes created by sudden changes in current, and is suited for modern lithography for ease of implementation.

SUMMARY OF THE INVENTION

The present invention is directed to a closed-loop switched capacitor network power supply for converting a supply voltage into an output voltage for application to a load that approaches a set-point voltage. The power supply comprises a variable frequency source, a switched capacitor network, and a feedback control circuit.

The variable frequency source has an input for receiving an error voltage, and generates a control voltage at a control frequency based on the error voltage.

The switched capacitor network has an input which receives the supply voltage and an output which provides the output voltage to the load. The switched capacitor network comprises a plurality of network sections operating in parallel, with each network section comprising a capacitor coupled to the input by a first switch and coupled to the output by a second switch. The first and second switches are coupled to, and controlled by, the variable frequency source so as to alternately charge the capacitor with the supply voltage and discharge the capacitor into the load at a rate based on the control frequency of the control voltage.

Finally, the feedback control circuit has a first input coupled to the output of the switched capacitor network to receive the output voltage and a second input which receives the set-point voltage. An output is coupled to the variable frequency source to provide the variable frequency source with the error voltage. The feedback control circuit generates the error voltage based on the difference between the output voltage and the set-point voltage.

Further objects and advantages of the invention will appear from the following description, taken together with the accompanying drawings.

BRIEF DESCRIPTION OF THE DRAWINGS

The invention will now be described, by way of example only, with reference to the following drawings, in which.

DETAILED DESCRIPTION OF THE PREFERRED EMBODIMENT

Figure 1:
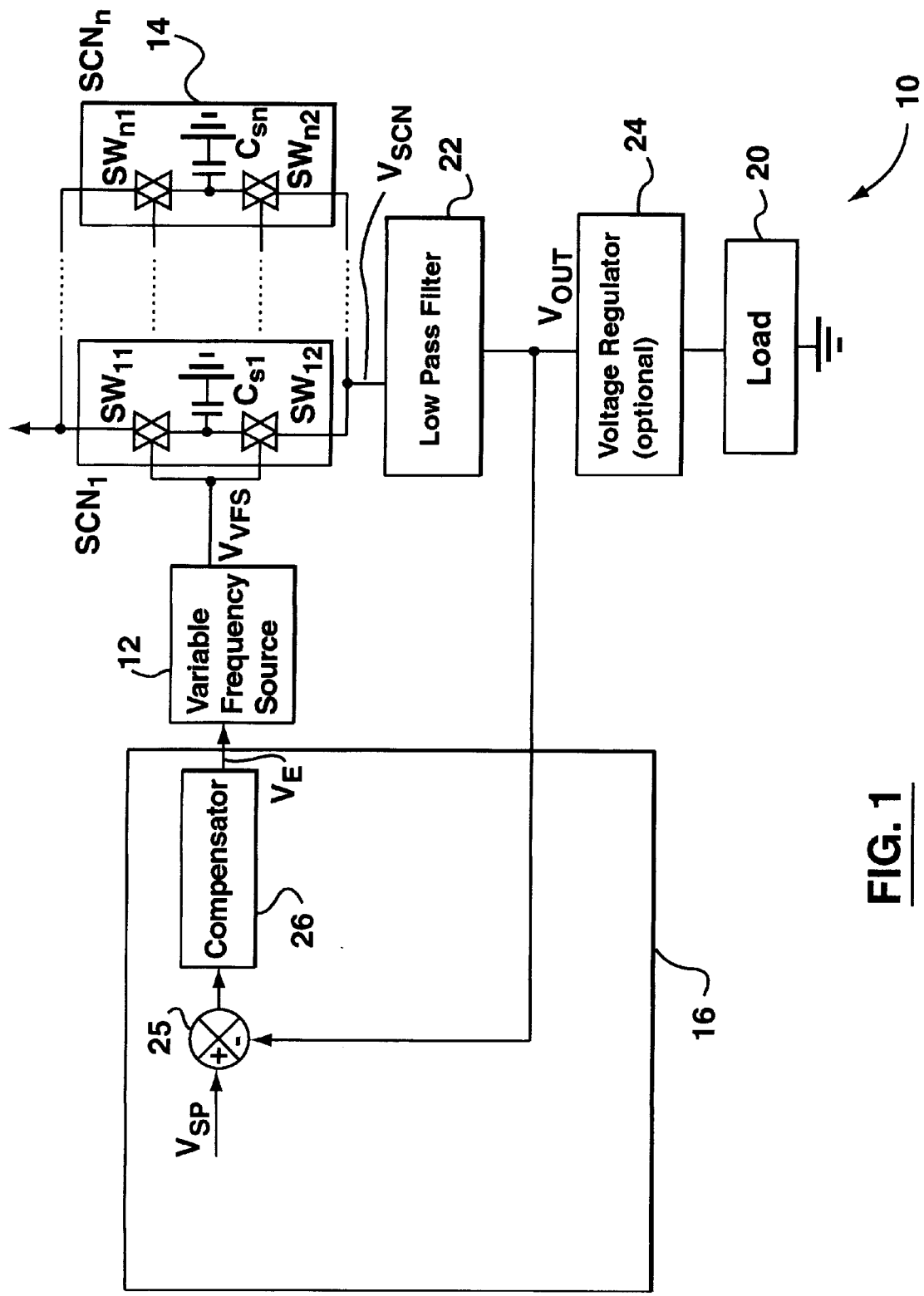
FIG. 1 is a block diagram of a preferred embodiment of the present invention.

Referring to FIG. 1, illustrated therein is a closed-loop switched capacitor network power supply 10 made in accordance with a preferred embodiment of the present invention. Power supply 10 includes a variable frequency source (VFS) 12, a switched capacitor network 14, and a feedback control circuit 16. Power supply 10 is powered by a supply voltage $V_S$ and produces an output voltage $V_{OUT}$ corresponding to a user selected set-point voltage $V_{SP}$, for application to a load 20 through low pass filter 22. Power supply 10 may optionally include a voltage regulator 24 to further condition the voltage being applied to the load.

VFS 12 is a conventionally known variable frequency source, such as a voltage-controlled or a current-controlled oscillator. The oscillation frequency of the control voltage $V_{VFS}$ is determined by the value of the voltage provided to the bases of the input transistors of VFS 12, as is conventionally known. VFS 12 generates a control voltage $V_{VFS}$ having a control frequency that is dependant on the difference between set-point voltage $V_{SP}$ and output voltage $V_{OUT}$ and which is provided in the form of current to its input transistors. VFS 12 is coupled to switched capacitor network 14 and provides control voltage $V_{VFS}$ to the switches of switched capacitor network 14.

Switched capacitor network 14 comprises a plurality of switched capacitor network sections $SCN_i$ operating in parallel. Switched capacitor network 14 generates a network voltage $V_{SCN}$ which is dependant on the control frequency of control voltage $V_{VFS}$ and the number of network sections $SCN_i$ configured within switched capacitor network 14. Each network section $SCN_i$ consists of first and second electronic switches $SW_{i1}$ and $SW_{i2}$ and a capacitor $C_{Si}$. Switches $SW_{i1}$ and $SW_{i2}$ can be implemented using any well-known electronic switching devices such as field effect transistors (FETs), gate-turn-off thyristors (GTOs), and the like that match the circuit frequency and the power output of the power supply 10.

Each capacitor $C_{Si}$ has one terminal grounded and the other terminal attached to first and second switches $SW_{i1}$ and $SW_{i2}$. Switch $SW_{i1}$ is configured with respect to capacitor $C_{Si}$ such that when switch $SW_{i1}$ is closed, supply voltage $V_S$ charges up capacitor $C_{Si}$ through switch $SW_{i1}$. Switch $SW_{i2}$ is configured with respect to capacitor $C_{Si}$ such that when switch $SW_{i2}$ is closed, any charge present in capacitor $C_{Si}$ is discharged through switch $SW_{i2}$ to the output terminal of the switched capacitor network 14. Switches $SW_{i1}$ and $SW_{i2}$ operate at a 180° phase angle from one another, such that when switch $SW_{i1}$ is off, $SW_{i2}$ is on, and vice versa. This switching operation allows supply voltage $V_S$ to charge capacitor $C_{Si}$ in one state and allows capacitor $C_{Si}$ to discharge its accumulated charge into the output of switched capacitor network 14 in the other state.

As discussed, VFS 12 provides control voltage $V_{VFS}$ to trigger switches $SW_{i1}$ and $SW_{i2}$ of switched capacitor network 14. For optimal output voltage $V_{OUT}$ characteristics, control voltage $V_{VFS}$ triggers each set of switch pairs $SW_{i1}$ and $SW_{i2}$ separately, and in turn. Network sections $SCN_i$ (for i=1 to n) are preferably configured such that the switches of each network section $SCN_i$ are triggered at even spaced intervals from each other network section $SCN_j$ (where i≠j) by control voltage $V_{VFS}$. Simultaneously, same-unit switches $SW_{i1}$ and $SW_{i2}$ are triggered on and off at 180° phase angle intervals from one another, such that when switch $SW_{i1}$ is off, $SW_{i2}$ is on, and vice versa.

Figure 2:
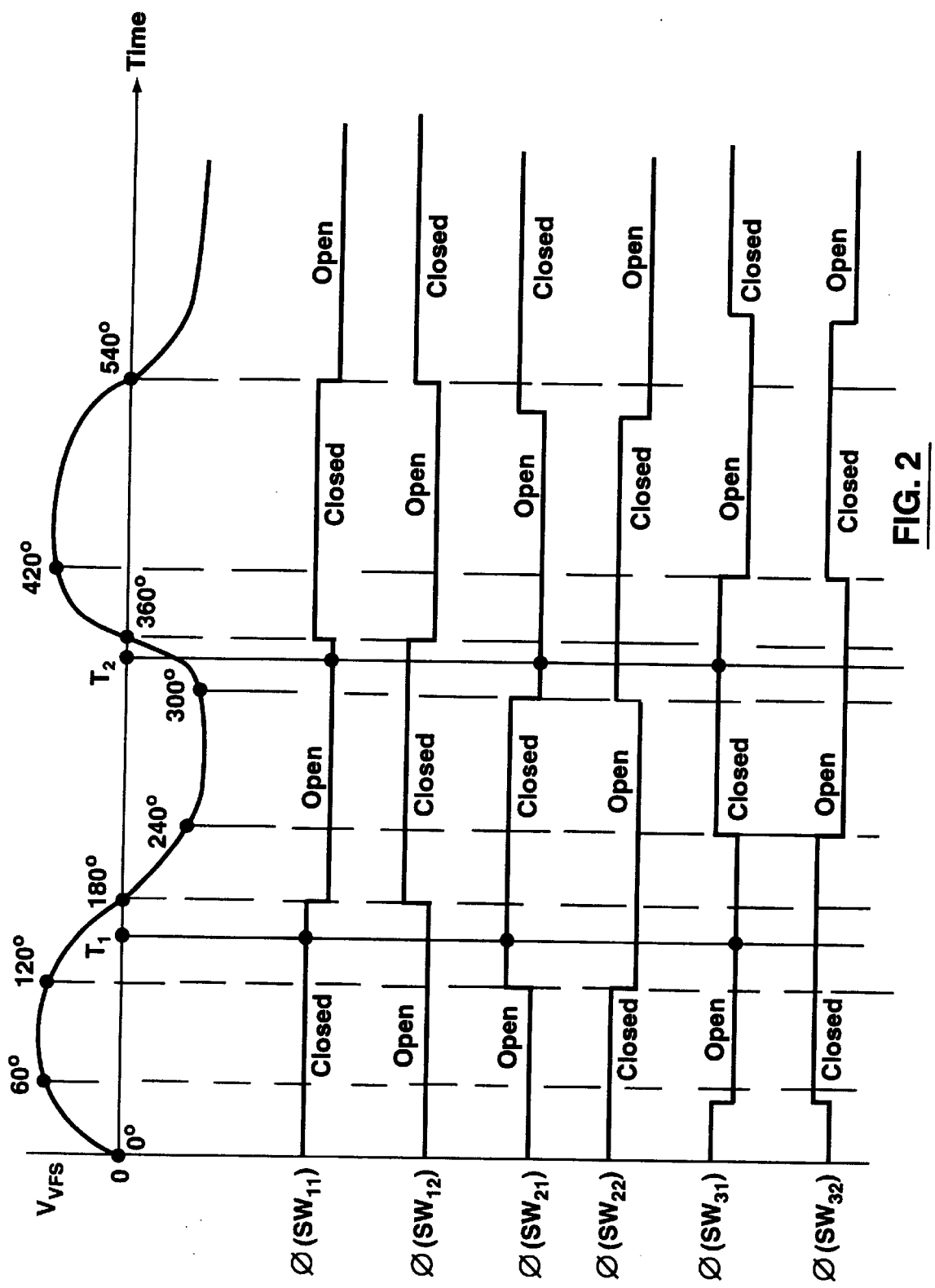
FIG. 2 is a phase diagram of the periodic switching characteristics of three switch pairs $SW_{i1}$ and $SW_{i2}$ (for i=1 to 3) of a switched capacitor network operating in response to a control voltage $V_{VFS}$.

FIG. 2 is a phase diagram of the periodic switching of three network sections $SCN_1$, $SCN_2$, and $SCN_3$. As shown, the switches $SW_{i1}$ and $SW_{i2}$ of network sections $SCN_i$ are triggered by control voltage $V_{VFS}$ at 120° intervals.

Specifically, switch $SW_{11}$ of network section $SCN_1$ is triggered closed and switch $SW_{12}$ is triggered open (such that capacitor $C_{S1}$ is charged) at a phase angle of 0°. Switch $SW_{11}$ will be triggered open and switch $SW_{12}$ will be triggered closed (such that capacitor $C_{Si}$ is discharged) at a phase angle of 180° (0°+180°). Similarly, switch $SW_{21}$ will be triggered closed and switch $SW_{22}$ will be triggered open at a phase angle of 120° and switch $SW_{21}$ will be triggered open and switch $SW_{22}$ will be triggered closed at 300° (120°+180°). Finally, switch $SW_{31}$ will be triggered closed and switch $SW_{32}$ will be triggered open at a phase angle of 240° and switch $SW_{31}$ will be triggered open and switch $SW_{32}$ will be triggered closed at a phase angle of 420° (or 60° of the next cycle). Accordingly, the switches of switched capacitor network 14 are triggered by control voltage $V_{VFS}$ in an alternating manner such that the various capacitor network sections $SCN_1$, $SCN_2$, and $SCN_3$ operate at regular phase angles from one another and ripple is minimized.

VFS 12 and switched capacitor network 14 can be designed to achieve such a switching characteristic in various ways. For example, control voltage $V_{VFS}$ may have a sinusoidal characteristic (as in FIG. 2) and additionally, each switch of switches $SW_{i1}$ and $SW_{i2}$ can be triggered by an appropriately phase-shifted control voltage $V_{VFS}$. Phase shifters can be inserted in between VFS 12 and the switches of switched capacitor network 14 to provide phase-shifted versions of control voltage $V_{VFS}$ to switches $SW_{x1}$ and $SW_{x2}$ where x≧2. It should be noted that would not be necessary to phase-shift the input for the first set of switches $SW_{11}$ and $SW_{12}$.

Another example is where VFS 12 produces a digital signal using a stable digital clock signal which is converted into i digital signals such that each signal has a different relative phase angle in order to successively trigger switches $SW_{i1}$ and $SW_{i2}$ of switched capacitor network 14. In the case of two capacitor network sections $SCN_1$ and $SCN_2$, a simple bistable circuit can be used to trigger the switches $SW_{11}$ and $SW_{12}$ 180° out of phase with switches $SW_{21}$ and $SW_{22}$.

Referring back to FIG. 1, switched capacitor network 14 has the following effective time-averaged impedance:

$$\bar{Z}_{eff} = \frac{1}{f_{VFS} C_{eff}}$$

where $f_{VFS}$ is the frequency of the control voltage $V_{VFS}$ and $C_{eff}$ is the equivalent capacitance of switched capacitor network 14. Equivalent capacitance $C_{eff}$ is the sum of the capacitance of i capacitors $C_{Si}$ of i network sections of switched capacitor network 14 or:

$$C_{eff} = \sum_{i=1}^{n} C_{Si}$$

Referring back to FIG. 1, as discussed, the time-averaged effective impedance $Z_{eff}$ of switched capacitor network 14 is controlled by the frequency of control voltage $V_{VFS}$. Accordingly, the output voltage $V_{OUT}$ can be controlled by adjusting the frequency of control voltage $V_{VFS}$. By adjusting this frequency in accordance with the difference between output voltage $V_{OUT}$ and set-point voltage $V_{SP}$, power supply 10 can control the value of output voltage $V_{OUT}$. When the frequency of control voltage $V_{VFS}$ is increased, the effective time-averaged impedance $Z_{eff}$ of switched capacitor network 14 will decrease and output voltage $V_{OUT}$ will increase. When the frequency of control voltage $V_{VFS}$ is decreased, the effective time-averaged impedance $Z_{eff}$ of switched capacitor network 14 will increase and output voltage $V_{OUT}$ will decrease.

Network voltage $V_{SCN}$ of switched capacitor network 14 is provided to low pass filter 22 which in turn provides a low pass filtered version of the network voltage $V_{SCN}$ as output voltage $V_{OUT}$. Optionally, output voltage $V_{OUT}$ passes through voltage regulator 24 before reaching load 20. Power supply 10 regulates output voltage $V_{OUT}$ through the use of feedback control circuit 16. Feedback control circuit 16 comprises a comparator 25 which compares set-point voltage $V_{SP}$ and output voltage $V_{OUT}$ and provides the difference to a compensator 26 which generates an error voltage $V_E$. Feedback control circuit 16 automatically adjusts output voltage $V_{OUT}$ towards set-point voltage $V_{SP}$ using well known automatic feedback control techniques and generates error voltage $V_E$ to drive VFS 12 to produce an appropriate control voltage $V_{VFS}$.

Figure 3:
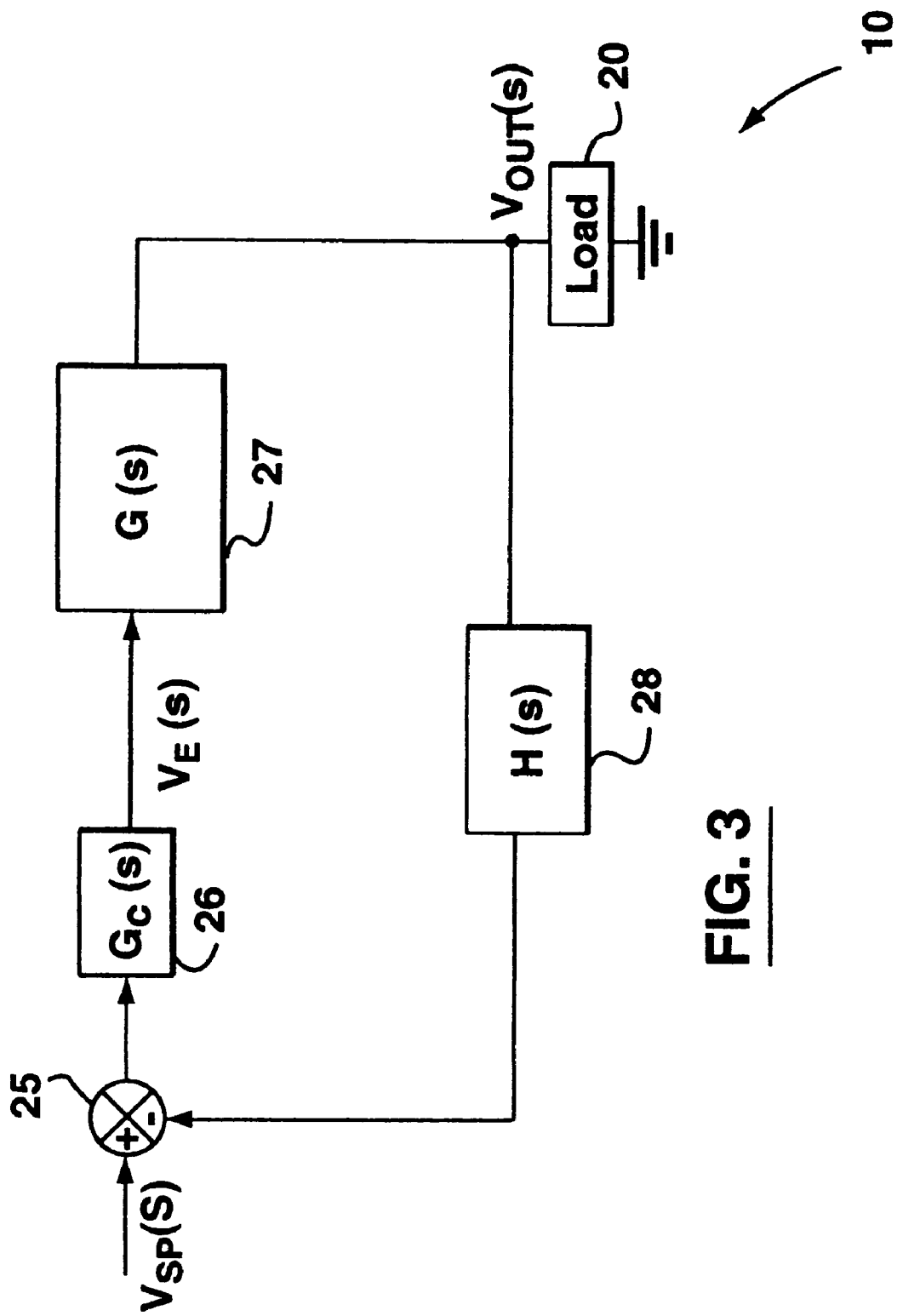
FIG. 3 is a system block diagram illustrating the domain transfer functions of the preferred embodiment of the present invention.

FIG. 3 shows a system block diagram representation of power supply 10. As is well known, this representation allows simultaneous determination of the forced and the transient responses of the system. Feedback control circuit 16 comprises control circuitry 28 having a transfer function of H (s) and compensator 26 having the transfer function of $G_C$ (s). Compensator 26 produces the Laplace transform $V_E(s)$ of the error voltage $V_E$ based on the cumulative difference between the Laplace transform $V_{OUT}(s)$ of the output voltage $V_{OUT}$ and the Laplace transform $V_{SP}(s)$ of the output voltage $V_{SP}$. The block 27 represents the combined transfer function of VFS 12, switched capacitor network 14, and the optional low pass filter 22 and has a transfer function of G (s). The domain transfer function of power supply 10 as determined from the network node of set-point voltage $V_{SP}$ is therefore:

$$V_{SP}(s) - H(s)V_{OUT}(s) = \frac{V_{OUT}(s)}{G_C(s)G(s)}$$

Rearranged, the transfer function of power supply 10 as a ratio of $V_{OUT}(s)$ to $V_{SP}(s)$ is:

$$\frac{V_{OUT}(s)}{V_{SP}(s)} = \frac{G_C(s)G(s)}{1 + G_C(s)G(s)H(s)}$$

Accordingly, feedback control circuit 16 can be designed to implement transfer functions $G_C(s)$ and H(s) so that the value of the ratio $V_{OUT}(s)/V_{SP}(s)$ is unity. Transfer function G(s) will remain constant for a particular configuration of switched capacitor network 14. In this way, $V_E(s)$ produced by feedback control circuit 16 over various operating conditions will adaptively control VFS 12 such that the alternating operation of switches $SW_{i1}$ and $SW_{i2}$ of capacitor network 14 will cause output voltage $V_{OUT}$ to approach set-point voltage $V_{SP}$.

Figure 4:
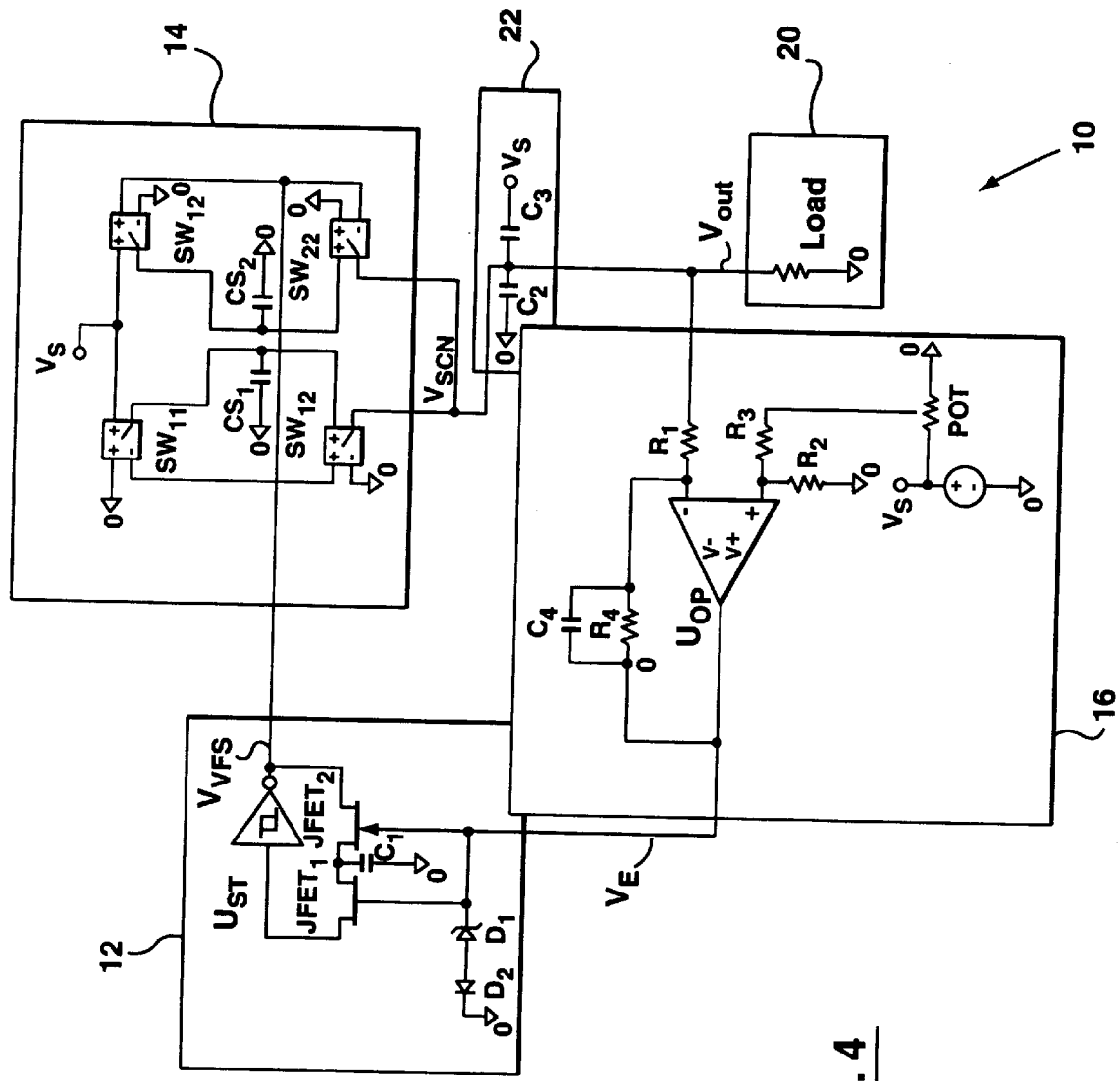
FIG. 4 is a more detailed schematic diagram of the preferred embodiment.

Now referring to FIG. 4, a possible circuit implementation of power supply 10 is shown. Power supply 10 is shown implemented using a simple Schmidt trigger VFS 12, two-stage switched capacitor network 14, and an operational amplifier configured to operate as feedback control circuit 16. VFS 12 produces a digital signal which triggers switches $SW_{i1}$ and $SW_{i2}$ of switched capacitor network 14 at appropriate phase angles so as to produce a network voltage $V_{SCN}$ that results in an appropriate output voltage $V_{OUT}$ for application to load 20. Output voltage $V_{OUT}$ is then applied to feedback control circuit 16 which provides compensation, if necessary and produces $V_E$ to regulate VFS 12 to adjust the operation of switched capacitor network 14.

VFS 12 includes a bistable Schmidt trigger $U_{ST}$ which is used to generate a digital control voltage having a bistable transfer characteristic. VFS 12 also includes a delay circuit which comprises two JFET transistors $JFET_1$ and $JFET_2$ and a capacitor $C_1$. The delay circuit is connected across Schmidt trigger $U_{ST}$. The emitter of transistor $JFET_1$ and the collector of transistor $JFET_2$ are connected to ground via capacitor $C_1$ for improved bias stability. The collector of transistor $JFET_1$ is connected to the input of Schmidt trigger $U_{ST}$ and the emitter of transistor $JFET_2$ is connected to the output of Schmidt trigger $U_{ST}$. VFS 12 is designed to produce a control voltage $V_{VFS}$ that can meet the threshold voltages of the transistors $JFET_1$ and $JFET_2$. As is well known, typical triggering voltages are +5 and −5 Volts, but newer low power transistors have triggering voltages of +2.5 and −2.5 Volts.

VFS 12 also includes a voltage limiting circuit consisting of a zener diode $D_1$ and a diode $D_2$ which are anode connected. The cathode of diode $D_2$ is connected to ground and the cathode of zener diode $D_1$ is connected to the gates of transistors $JFET_1$ and $JFET_2$. The diodes $D_1$ and $D_2$ are used to maintain an input voltage signal within the operable bounds of VFS 12 by grounding the input when the input voltage reaches the breakdown voltage of zener diode $D_1$. As the input voltage changes on the gate of the JFET transistors $JFET_1$ and $JFET_2$, Schmidt trigger $U_{ST}$ of VFS 12 generates an appropriately modified digital control voltage $V_{VFS}$ for input into switched capacitor network 14.

Switched capacitor network 14 is shown comprising two capacitor network sections $SCN_1$ and $SCN_2$. Capacitor network section $SCN_1$ consists of a capacitor $C_{S1}$ having one terminal coupled to supply voltage $V_S$ through first switch $SW_{11}$ and coupled to the output of switched capacitor network 14 through second switch $SW_{12}$. The other terminal of capacitor $C_{S1}$ is connected to ground. Similarly, capacitor network section $SCN_2$ consists of a capacitor $C_{S2}$ having one terminal coupled to supply voltage $V_S$ through a first switch $SW_{21}$ and coupled to the output of switched capacitor network 14 through a second switch $SW_{22}$. The other terminal of capacitor $C_{S2}$ is connected to ground.

The switches $SW_{11}$, $SW_{12}$, $SW_{21}$, and $SW_{22}$ of capacitor network sections $SCN_1$ and $SCN_2$ receive the control voltage $V_{VFS}$ of VFS 12. It should be noted that switches $SW_{11}$, $SW_{12}$, $SW_{21}$, and $SW_{22}$ have "+" and "−" terminals. The "−" terminals invert the input signal being applied. Thus, switches $SW_{11}$, $SW_{12}$, $SW_{21}$, and $SW_{22}$ are closed when a "0" is applied to the negative "−" terminal or a "1" is applied to the positive "+" terminal. It should also be noted that the fourth terminal of switches $SW_{11}$, $SW_{12}$, $SW_{21}$, and $SW_{22}$ which is not used within the switch input/output configuration is grounded. Switches $SW_{11}$ and $SW_{21}$ both receive an inverted version of control voltage $V_{VFS}$ and switches $SW_{12}$ and $SW_{21}$ receive the direct control voltage $V_{VFS}$.

Figure 5:
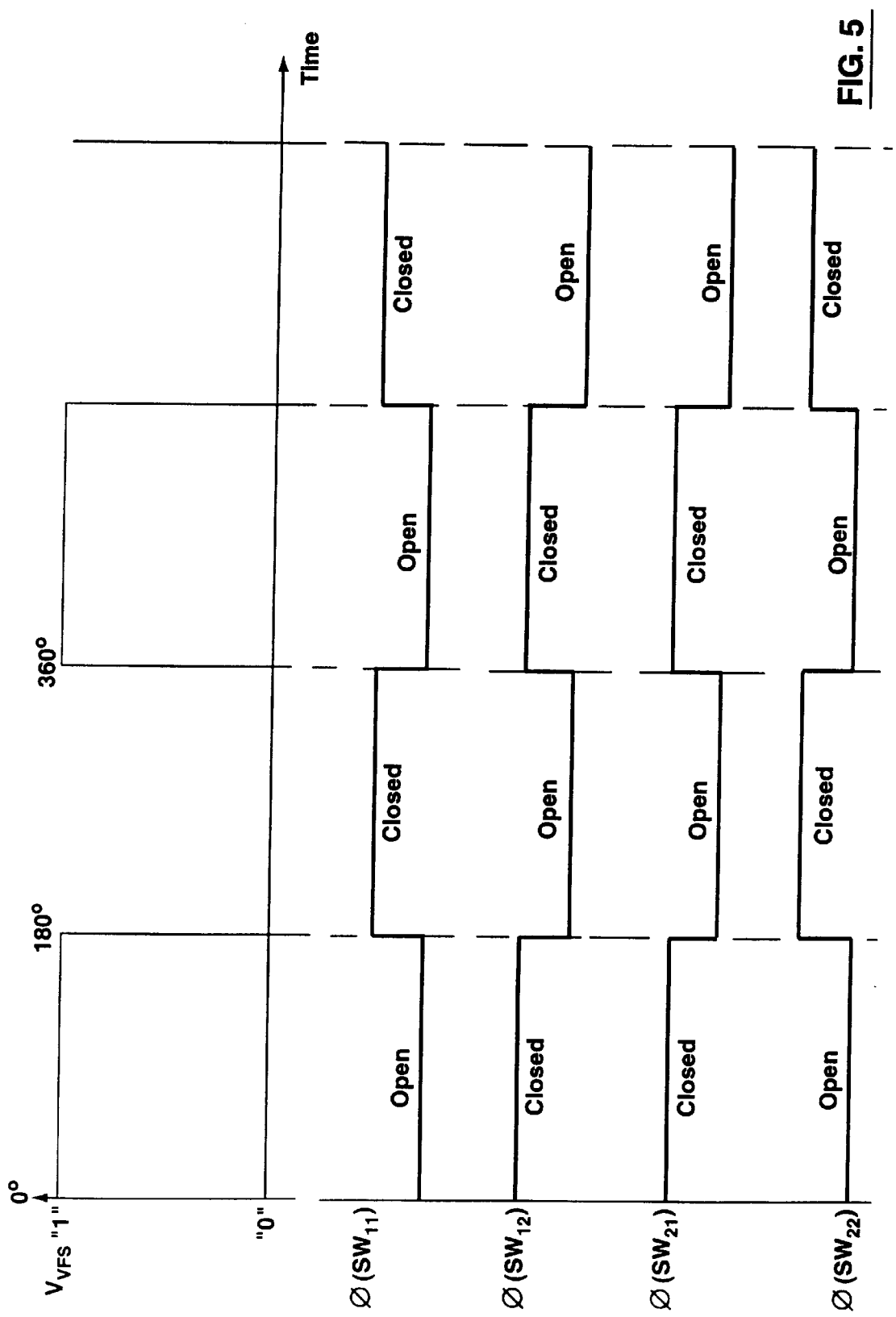
FIG. 5 is a phase diagram of the periodic switching characteristics for two switch pairs $SW_{i1}$ and $SW_{i2}$ (for i=1 and 2) of the switched capacitor network of FIG. 4 operating in response to a digital control voltage $V_{VFS}$.

FIG. 5 is a phase diagram of the periodic switching of the switches $SW_{i1}$ and $SW_{i2}$ of capacitor network sections $SCN_1$ and $SCN_2$. As shown, the switches $SW_{i1}$ and $SW_{i2}$ of network section $SCN_i$ are triggered by control voltage $V_{VFS}$ to operate 180° out of phase from each other. When control voltage $V_{VFS}$ is "0", switches $SW_{11}$ and $SW_{22}$ will be closed and switches $SW_{12}$ and $SW_{21}$ will be open. When a first switch $SW_{11}$ or $SW_{21}$ is closed, the capacitor $C_{S1}$ or $C_{S2}$, respectively is charged by supply voltage $V_S$ and when a second switch $SW_{12}$ or $SW_{22}$ is closed, the capacitor $C_{S1}$ or $C_{S2}$ will discharge into load 20.

Specifically, switch $SW_{11}$ will be triggered open and $SW_{12}$ triggered closed at 0° (when $V_{VFS}$ goes high). Switch $SW_{11}$ will be triggered closed and $SW_{12}$ triggered open at 180° (when $V_{VFS}$ goes low). Correspondingly, switch $SW_{21}$ will be triggered closed and $SW_{22}$ triggered open at 0° (when $V_{VFS}$ goes high). Switch $SW_{21}$ will be triggered open and $SW_{22}$ triggered closed at 180° (when $V_{VFS}$ goes low).

When triggered, there are delay periods associated with the time required for switches $SW_{11}$, $SW_{12}$, $SW_{21}$, and $SW_{22}$ to change between open and closed states. Heat is generated by the switches due to the moderate resistance that is present across the switches while these transitions take place. It should be noted that the faster that the transitions occur, the less power the switches will consume during operation and the more energy efficient power supply 10 will be.

Referring back to FIG. 4, network voltage $V_{SCN}$ of switched capacitor network 14 is provided to the input of low pass filter 22. Low pass filter 22 comprises two capacitors $C_2$ and $C_3$. Capacitor $C_2$ has one terminal coupled to the output of switched capacitor network 14 and the other terminal connected to ground. Capacitor $C_3$ has one terminal coupled to the output of switched capacitor network 14 and the other terminal coupled to supply voltage $V_S$. Low pass filter 22 reduces the amplitude of oscillations of network voltage $V_{SCN}$ and produces output voltage $V_{OUT}$.

As the number of switched capacitor network sections $SCN_i$ increase, the ripple of network voltage $V_{SCN}$ is reduced and less low pass filtering is required to maintain ripple of the output voltage $V_{OUT}$ within a particular range. This is due to the fact that each capacitor $C_{Si}$ (as i increases) will discharge less before beginning another charging cycle. Further, i switched network sections $SCN_i$ operating in parallel and being triggered in an alternating fashion will produce a ripple having a frequency i times that of a single switched network section SCN. Since capacitors $C_2$ and $C_3$ of low pass filter 22 are more effective at reducing ripple amplitude as the frequency of the ripple increases, output voltage $V_{OUT}$ will have reduced ripple for such a configuration.

Feedback control circuit 16 is implemented using an operational amplifier $U_{OP}$ configured as a Miller integrator to generate error voltage $V_E$ for adjusting the operation of VFS 12. Output voltage $V_{OUT}$ is provided to operational amplifier $U_{OP}$ through a resistor $R_1$ and compared with a set-point voltage $V_{SP}$ which is provided through a resistor $R_2$ across a voltage divider comprising resistors $R_2$ and $R_3$. Set-point voltage $V_{SP}$ is set using a potentiometer POT which has one terminal connected to ground and another terminal connected to supply voltage $V_S$. By adjusting potentiometer POT, the voltage provided to operational amplifier $U_{OP}$ can be suitably altered.

Operational amplifier $U_{OP}$ is configured using a capacitor $C_4$ and resistor $R_4$ in parallel in a feedback loop between its negative input and its output. Resistor $R_4$ preferably has a large value to limit the closed-loop gain of op-amp $U_{OP}$ to a finite value. As a result, operational amplifier $U_{OP}$ generates error signal $V_E$ which is proportional to the integral of the difference between output voltage $V_{OUT}$ and set-point voltage $V_{SP}$, over time. The values of resistors $R_1$, $R_2$, $R_3$, $R_4$ and capacitor $C_4$ are selected so that feedback control circuit 16 provides VFS 12 with an appropriate error voltage $V_E$ to drive VFS 12 to produce and appropriate control voltage $V_{VFS}$.

Figure 6:
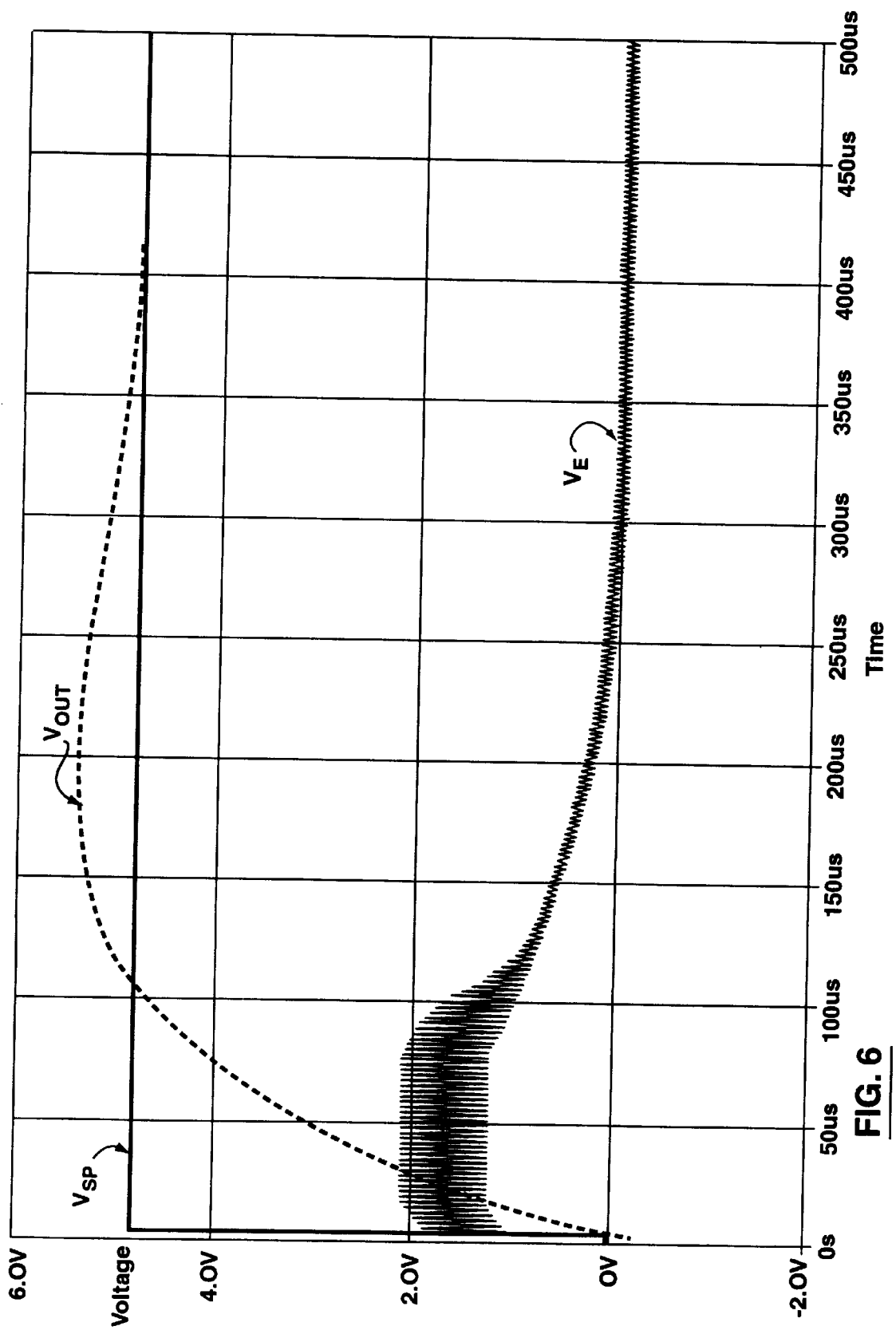
FIG. 6 is graph of a unit step function set-point voltage $V_{SP}$, an error voltage waveform $V_E$ output by the feedback control circuit an output voltage waveform $V_{OUT}$ produced by the switched capacitor network in response to the set-point voltage $V_{SP}$.

FIG. 6 illustrates a typical error voltage $V_E$ characteristic produced by feedback control circuit 16 and the resulting output voltage $V_{OUT}$ characteristic produced by the power supply 10 circuit of FIG. 4, in response to a step function set-point voltage $V_{SP}$ of 5 Volts. It should be noted that in this circuit the control voltage frequency $f_{VFS}$ is approximately 460 KHz but that this value depends on the specific performance of VFS 12 and on the reaction time of the switches of switched capacitor network 14.

As the graph indicates, output voltage $V_{OUT}$ of power supply 10 is relatively free of ripple, although there is a slight voltage overshoot prior to circuit stabilization. Any voltage overshoot of output voltage $V_{OUT}$ can be eliminated through the use of optional voltage regulator 24. Voltage regulator 24 serves to regulate the voltage based on the set-point voltage $V_{SP}$ such that the overshoot energy is rapidly converted to heat energy within voltage regulator 24.

In use, power supply 10 operates as a step-down power supply but can also be configured to operate as a step-up power supply by implementing a charge pump wherein a fixed number of capacitors $C_{Si}$ charge in parallel, and discharge in series thereby elevating the output voltage $V_{OUT}$ into a higher operating region, as is conventionally known. The number of capacitor network sections $SCN_i$ within switched capacitor network 14 determines the extent to which the switches across the switched capacitor network 14 act in parallel, thereby reducing the overall "on" state impedance of the network and increasing the overall energy efficiency of the circuit. As previously discussed, the number of capacitor network sections $SCN_i$ also affects the amount of ripple of output voltage $V_{OUT}$.

As discussed, by varying set-point voltage $V_{SP}$, a user may select an appropriate output voltage $V_{OUT}$ characteristic for power supply 10. By using a constantly varying set-point voltage $V_{SP}$, power supply 10 can be used to convert a DC source into an AC source using an AC set-point voltage $V_{SP}$ characteristic. Due to the highly efficient automatic feedback compensation and control mechanism of power supply 10, a consistent AC output voltage $V_{OUT}$ can be generated. Further, by providing power supply 10 with a set-point voltage $V_{SP}$ that has a frequency that varies over time, power supply 10 can operate as a variable frequency drive power supply.

Finally, power supply 10 can provide highly accurate measurement of power consumption by load 20. When switched capacitor network 14 conducts current to load 20 when switches $SW_{12}$ and $SW_{22}$ are closed, through its equivalent capacitor $C_{eff}$, current passes from the capacitor to load 20 according to the formula:

$$I_{load} = \frac{(V_S - V_{OUT})}{R_{load}} e^{-t/R_{load} C_{eff}}$$

where I is the current at time t, $V_S$ is the initial voltage across load 20, $V_{OUT}$ is the output voltage, $R_{load}$ is the load resistance, and $C_{eff}$ is the equivalent capacitance. Since the oscillation of $SW_{12}$ and $SW_{22}$ does not allow for a full discharge of the capacitance $C_{eff}$, time t will only run between a limited range $t_2-t_1$, where $t_2-t_1$ is the total time that switches $SW_{12}$ and $SW_{22}$ will be turned on. Accordingly, the charge passed through load 20 will be:

$$Q_{load} = \int_{t_1}^{t_2} I_{load} d\tau$$

Since this equation is a measurement of charge per oscillation cycle, the average current produced by power supply 10 is:

$$\bar{I}_{load} = Q_{load} f_{VFS}$$

Since all of these variables are known, the power consumption of load 20 can be easily calculated by determining the average current by substituting the various values $V_S$, $V_{OUT}$, $R_{load}$, $C_{eff}$, and the frequency of the control voltage $V_{VFS}$ into the above equations and by multiplying this value by the output voltage $V_{OUT}$. This type of calculation is possible since the power consumed by load 20 is a simple linear relationship of the frequency of the pulses of the control voltage $V_{VFS}$.

Power supply 10 can be used in high and medium power applications as well as low-power applications, such as motor control, AC supply, power distribution, residential distribution, and general electronics. Power supply 10 can also accommodate a time-varying set-point voltage $V_{SP}$ signal such that an input DC voltage is converted into an AC output. Further, power supply 10 can also accommodate a variable AC set-point voltage $V_{SP}$ signal to operate as a variable frequency drive power supply.

Figure 7:
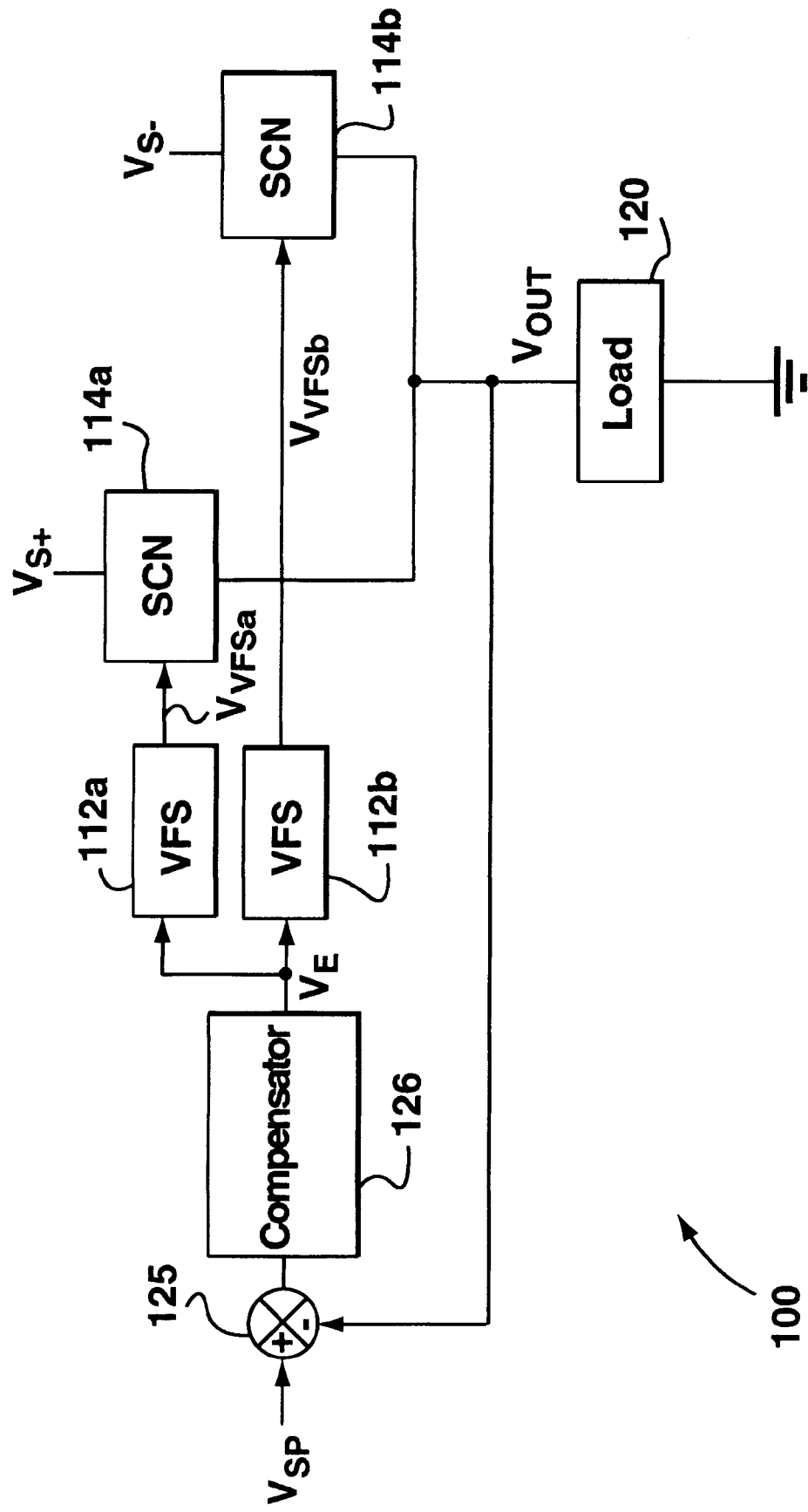
FIG. 7 is a block diagram of another embodiment of the present invention configured as a bipolar power supply.

FIG. 7 shows an alternative embodiment of the power supply 100 of the present invention which is configured for operation with a conventionally known bipolar AC source. Common elements between the alternative power supply 100 and the power supply 10 will be denoted by the same numerals but with one hundred added thereto.

Power supply 100 is designed to be powered by a typical AC source consisting of positive and negative source voltages $V_{S+}$ and $V_{S-}$. Power supply 100 includes a comparator 125, a compensator 126, variable frequency sources VFS 112a and 112b, switched capacitor networks 114a and 114b, and a load 120.

VFS 112a is coupled to switched capacitor network SCN 114a and provides switched capacitor network SCN 114a with the output control signal $V_{VFSa}$. VFS 112b is coupled to switched capacitor network SCN 114b and provides SCN 114b with the output control signal $V_{VFSb}$. Switched capacitor network SCN 114a is powered by positive voltage $V_{S+}$ and switched capacitor network SCN 114b is powered by negative voltage $V_S$. Switched capacitor networks SCN 114a and 114b provide a load 120 with a combined output voltage $V_{OUT}$. This output voltage $V_{OUT}$ is then fed back to comparator 125 which compares set-point voltage $V_{SP}$ and output voltage $V_{OUT}$ and provides the difference to compensator 126 which generates an error voltage $V_E$. This error voltage $V_E$ is provided to VFS 112a and 112b to produce control voltages $V_{VFSa}$ and $V_{VFSb}$. Control voltages $V_{VFSa}$ and $V_{VFSb}$ trigger the switches of switched capacitor networks 114a and 114b, as previously described.

In order to effect proper adjustment of output voltage $V_{OUT}$ towards the set-point voltage $V_{SP}$, VFS 112a is designed to operate in an inverse manner to VFS 112b. For example, if VFS 112a changes the frequency of control voltage $V_{VFS}$ in proportion to the input error voltage $V_E$, VFS 112b will output a control voltage $V_{VFS}$ having a frequency that varies inversely to error voltage $V_E$. In addition, VFS 112a and VFS 112b can be designed so that they shut down SCN 114a and SCN 114b at particular thresholds of error voltage $V_E$, respectively. In this way, only one of SCN 114a and SCN 114b will be active at any particular time to ensure that the two supply voltages $V_{S+}$ and $V_{S-}$ are not connected. During operation, SCN 114a will cause current to be pushed through the load (when active) and SCN 114b will cause current to be drawn from load 120 (when active).

Figure 8:
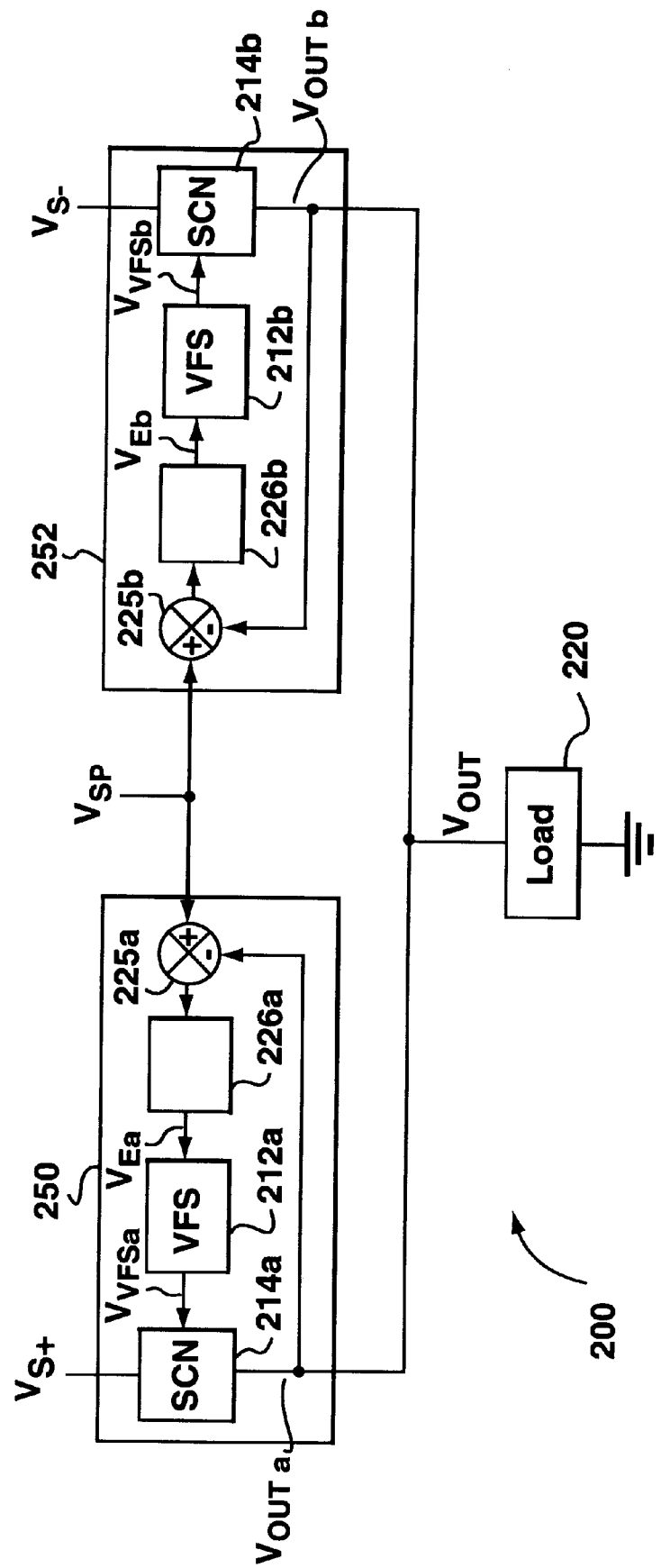
FIG. 8 is a block diagram of a further embodiment of the present invention configured as a bipolar power supply.

FIG. 8 shows another alternative embodiment of the power supply 200 of the present invention, configured for operation with a conventionally known bipolar AC source. Common elements between the alternative power supply 200 and the power supply 10 will be denoted by the same numerals but with two hundred added thereto.

Power supply 200 utilizes two circuits 250 and 252 (each having a configuration similar to power circuit 10) to provide a bipolar power supply for a standard power equipment load 220. Circuit 250 comprises a comparator 225a, a compensator 226a, a variable frequency source VFS 212a, and a switched capacitor network SCN 214a configured together in an error correcting configuration. Correspondingly, circuit 252 comprises a comparator 215b, a compensator 216b, a variable frequency source VFS 212b and a switched capacitor network SCN 214b configured together in an error correcting configuration.

VFS 212a provides switched capacitor network SCN 214a with the output control signal $V_{VFSa}$ and VFS 212b provides SCN 214b with the output control signal $V_{VFSb}$. Switched capacitor networks SCN 214a and 214b are powered by voltages $V_{S+}$ and $V_{S-}$ respectively. Switched capacitor networks SCN 214a and 214b produce output voltage $V_{OUTa}$ and $V_{OUTb}$, respectively. Output voltage $V_{OUTa}$ and $V_{OUTb}$ combine to produce output voltage $V_{OUT}$ for application to load 220. Output voltages $V_{OUTa}$ and $V_{OUTb}$ are also fed back to comparators 225a and 225b, respectively. Comparators 225a and 225b compare set-point voltage $V_{SP}$ and output voltage $V_{OUTa}$ and $V_{OUTb}$ and provide the difference to compensators 226a and 226b, respectively. Compensators 226a and 226b generate error voltages $V_{Ea}$ and $V_{Eb}$ which are provided to VFS 212a and 212b to produce control voltages $V_{VFSa}$ and $V_{VFSb}$ to trigger the switches of switched capacitor networks 214a and 214b, as previously described.

During operation, the use of the two error correcting circuits 250 and 252, creates two opposite polarities on load 220. At any one time, circuit 250 will push current through load 220 while circuit 252 draws current from load 220. It should be understood that multiple error correcting circuits such as 250 or 252 could be connected together in various configurations in order to generate multiphase output power.

The present invention provides the user with several significant advantages over equivalent commercially available power supplies. The present invention uses switched capacitors to deliver an output voltage $V_{OUT}$ based on a set-point voltage $V_{SP}$ in a highly energy efficient and stable manner. The present invention also reacts quickly to sudden changes in load without inductive lag or voltage spikes that are typically caused by sudden changes in current.

The present invention stores electrical energy within an electric field of capacitors of the switched capacitor network and dispenses this energy in a highly controlled manner, thereby avoiding the energy losses of resistive components and the energy losses and bulkiness of inductors. Further, due to the use of capacitive elements, the present invention can be manufactured entirely using modern photolithographic techniques on a single substrate with high precision for use within a wide range of electronic products. The precision of the circuit is also well suited for accurate measurement of current and power consumption of the load.

Finally, the switches of the switched capacitor network can alternatively be silicon controlled rectifiers (SCRs); gate-turn-off thyristors (GTOs); junction transistors; field effect transistors; insulated gate bipolar transistors (IGBTs); MOS controlled thyristors (MCTs); junction field effect transistors (JFETs); bipolar mode JFETs (BMFETs); static induction thyristors (SITh); field controlled thyristors (FCTh); waveFETs or any combination thereof. Transistor selection is dependent on the approximate range of control frequency $V_{VFS}$ and output power. Feedback control circuit 16 can be implemented using a compensator for either integral or derivative control of the present invention, as is conventionally understood.

As will be apparent to persons skilled in the art, various modifications and adaptations of the structure described above are possible without departure from the present invention, the scope of which is defined in the appended claims.

I claim:

1. A switched capacitor power supply for converting a supply voltage into an output voltage which approaches a set-point voltage, for application to a load, said power supply comprising:

(a) a variable frequency source having an input for receiving an error voltage and an output which generates a control voltage at a control frequency based on the error voltage;

(b) a switched capacitor network having an input which receives the supply voltage and an output which provides the output voltage to the load, the switched capacitor network comprising a plurality of network sections operating in parallel, each network section comprising a capacitor coupled to the input by a first switch and coupled to the output by a second switch, the first and second switches being coupled to, and controlled by, the variable frequency source so as to alternately charge the capacitor with the supply voltage and discharge the capacitor into the load at a rate based on the control frequency of the control voltage; and (c) a feedback control circuit having a first input coupled to the output of the switched capacitor network to receive the output voltage, and a second input which receives the set-point voltage, and an output coupled to the variable frequency source which provides the variable frequency source with the error voltage, the feedback control circuit generating the error voltage based on the difference between the output voltage and the set-point voltage.

2. The power supply of claim 1, wherein for each network section:

(a) the first switch has a first input for receiving the supply voltage, a second input for receiving the control voltage from the variable frequency source and an output terminal, such that when the first switch is triggered closed by the control voltage, it connects the first input to the output;

(b) the second switch has a first input, a second input for receiving the control voltage from the variable frequency source and an output connected to the output of the switched capacitor network, such that when the second switch is triggered closed by the control voltage, it connects the first input to the output;

(c) the first switch always being closed when the second switch is open, and the first switch always being open when the second switch is closed; and (d) the capacitor has one terminal coupled to the second input of the first switch and the first input of the second switch and the other terminal coupled to ground, such that the capacitor charges with the supply voltage when the first switch is closed and discharges into the output of the switched capacitor network when the second switch is closed.

3. The power supply of claim 2, wherein the first switches of each network section are sequentially triggered by the variable frequency source to couple the capacitor of each network section to the input of switched capacitor network to charge with the supply voltage and the second switches of each network section are sequentially triggered by the variable frequency source to couple the capacitor of each network section to the output of the switched capacitor network to discharge into the load.

4. The power supply of claim 3, wherein the feedback control circuit comprises a comparator having an input coupled to the output of the switched capacitor network and the set-point voltage and an output coupled to the variable frequency source.

5. The power supply of claim 4, wherein the comparator is coupled to the output of the switched capacitor network through a compensator.

6. The power supply of claim 4, wherein the comparator is coupled to the variable frequency source through a compensator.

7. The power supply of claim 5, wherein the compensator comprises an operational amplifier having a compensation capacitor for integral control.

8. The power supply of claim 5, wherein the compensator comprises an operational amplifier having a compensation capacitor for derivative control.

9. The power supply of claim 3, wherein the capacitors of switched capacitor network charge in parallel and discharge in series to increase the value of the output voltage.

10. The power supply of claim 3, wherein the output of the switched capacitor network is coupled to the input of the feedback control circuit through a low pass filter to reduce the output ripple of output voltage.

11. The power supply of claim 3, wherein the output voltage of the switched capacitor network is coupled to the load through a voltage regulator to regulate the value of output voltage.

12. The power supply of claim 3, wherein the variable frequency source is a voltage controlled oscillator.

13. The power supply of claim 3, wherein the variable frequency source is a current controlled oscillator.

14. The power supply of claim 3, wherein the switches of the network sections comprise high frequency switching devices.

15. The power supply of claim 3, wherein the feedback control circuit comprises a digital controller having an input coupled to the output of the switched capacitor network for receiving the output voltage and an output coupled to the input of the variable frequency source, the digital controller being used to convert an analog output voltage into a digital error voltage.

16. The power supply of claim 3, wherein the supply voltage is a direct current voltage and the set-point voltage consists of a time-varying function, such that the power supply produces an alternating current output voltage.

17. The power supply of claim 3, wherein the set-point voltage has a time-varying frequency, such that the power supply operates as a variable frequency drive power supply.

* * * * *